US008693553B2

(12) United States Patent
Vaquero et al.

(10) Patent No.: US 8,693,553 B2
(45) Date of Patent: Apr. 8, 2014

(54) METHODS, APPARATUSES, AND COMPUTER PROGRAM PRODUCTS FOR ADAPTIVE SYNCHRONIZED DECODING OF DIGITAL VIDEO

(75) Inventors: Alvaro Vaquero, Irving, TX (US); Vijay Gondi, Irving, TX (US)

(73) Assignee: Nokia Corporation, Espoo (FI)

( * ) Notice: Subject to any disclaimer, the term of this patent is extended or adjusted under 35 U.S.C. 154(b) by 1466 days.

(21) Appl. No.: 11/966,502

(22) Filed: Dec. 28, 2007

(65) Prior Publication Data

US 2009/0168903 A1    Jul. 2, 2009

(51) Int. Cl.
*H04N 21/43* (2011.01)
(52) U.S. Cl.
CPC ................... *H04N 21/4305* (2013.01)
USPC .................................... 375/240.28
(58) Field of Classification Search
USPC ......................... 375/240.28, 240.29
See application file for complete search history.

(56) References Cited

U.S. PATENT DOCUMENTS

| 6,163,646 | A * | 12/2000 | Tanaka et al. ................ 386/201 |
| 6,262,776 | B1 | 7/2001 | Griffits |
| 2001/0044711 | A1 * | 11/2001 | Monda et al. ............. 704/200.1 |
| 2004/0125816 | A1 * | 7/2004 | Xu et al. ...................... 370/411 |
| 2005/0084237 | A1 | 4/2005 | Kellner et al. |
| 2006/0220930 | A1 * | 10/2006 | Lee ............................... 341/51 |

FOREIGN PATENT DOCUMENTS

| EP | 1 708 486 A2 | 10/2006 |
| WO | WO 2007/149695 A2 | 12/2007 |

OTHER PUBLICATIONS

Damir Isovic, et al., "*Timing constraints of MPEG-2 Decoding for High Quality Video: Misconceptions and Realistic Assumptions.*" Proceedings of the 15th Euromicro Conference on Real-Time Systems (ECRTS '03) IEEE, Jul. 2, 2003.
Haifeng Xu, et al., "*Client Architecture for MPEG-4 Streaming,*" IEEE Multimedia, IEEE Service Center, New York, NY, vol. 11, No. 2, Apr. 1, 2004.
The International Search Report for PCT Application No. PCT/IB2008/055177; Filed Sep. 12, 2008; Date of Completion, Apr. 9, 2009; Date of Mailing Apr. 21, 2009.
The Written Opinion for PCT Application No. PCT/IB2008/055177; Filed Sep. 12, 2008; Date of Completion, Apr. 9, 2009; Date of Mailing Apr. 21, 2009.
Office Action for Chinese Application No. 200880126577.X dated Mar. 12, 2012.
Office Action for Chinese Applications No. 200880126577.X dated Sep. 21, 2012.

* cited by examiner

*Primary Examiner* — Mark Rinehart
*Assistant Examiner* — Matthew Hopkins
(74) *Attorney, Agent, or Firm* — Alston & Bird LLP (57) ABSTRACT

An apparatus for adaptive synchronized decoding of digital video may include a processor. The processor may be configured to maintain a next key frame timestamp, decode a plurality of key frames of a video clip, decode a plurality of non-key frames of a video clip which arrive on time, and drop one or more non-key frames until the next key frame if a video frame arrives late and the next key frame is within a calculated drop time window based at least in part on the next key frame timestamp. Corresponding methods and computer program products are also provided.

22 Claims, 5 Drawing Sheets

METHODS, APPARATUSES, AND COMPUTER PROGRAM PRODUCTS FOR ADAPTIVE SYNCHRONIZED DECODING OF DIGITAL VIDEO

TECHNOLOGICAL FIELD

Embodiments of the present invention relate generally to digital video playback technology and in particular relate to methods, apparatuses, and computer program products for maintaining audio/video synchronization through adaptive synchronized decoding.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

This expansion of networks and growth of modes of communication has allowed for the creation and delivery of increasingly complex digital videos such as via downloading media content files or streaming of digital video files from a remote network device to a local network terminal. As the expansion in bandwidth and reach of networks has allowed for increasing complexity of digital videos and the delivery of video content to even mobile device terminals, the capabilities of computer hardware and software, such as that used in personal computers and in mobile devices such as PDAs and cell phones, have necessarily increased to keep up with the ever increasing demands of modern digital video playback.

In spite of developments in hardware and software, video content can always be created that exceeds the capabilities of a system regardless of the software or hardware involved, which codecs are used, or the resolution of the video content. When video content exceeds the capabilities of the system on which it is playing, the result is most often the loss of what is known as audio/video synchronization or AV sync (also sometimes referred to as pacing). Ideally, when video content is played on a device the audio and video tracks will remain in synchronization with each other so that, for example, when a person in the video speaks, the audio track of the voice will be in synchronization with the video track of the person opening his mouth, also commonly referred to as lip synchronization. However, when the video complexity exceeds the capabilities of the system on which it is playing, in minor cases lip synchronization may be lost and the audio of the person's voice may play either slightly before or slightly after the video showing the person moving his mouth. In worse cases where the requirements to play the video content more greatly exceed system capabilities, video playback may periodically freeze or hang up all together while the audio track may or may not continue to play. Such losses of AV sync are detrimental to viewer experience.

In order to attempt to maintain AV sync in situations where video content exceeds a system's abilities, several algorithms in the past have been proposed wherein portions of the video and/or audio track, known as frames, are dropped. While dropping audio frames may aid in maintaining AV sync, the experience for the viewer is greatly diminished as missing audio frames are almost always evident to a viewer. On the other hand, dropping one or more video frames is not necessarily noticeable to a viewer in most cases. For example, American television standards dictate the use of 30 video frames per second, while European standards specify the use of 25 frames per second for video playback and viewers are unable to discern any evident difference between the two playback standards. Consequently, in order to best maintain AV sync on a system when video content exceeds the system's abilities, a desirable approach is to drop one or more video frames while not dropping any audio frames.

Dropping of video frames may occur at two levels: (1) before being postprocessed or (2) before being decoded. In the first scenario where video frames are dropped after being decoded, but before being postprocessed, each time a frame is slightly late in its arrival to the postprocessor, it will not be postprocessed and rendered, which in theory will save enough time for the next frame to be postprocessed and displayed on time. In the second scenario, frames arriving late to the decoder may be dropped before being decoded.

To better understand how in the second scenario video frames may be dropped at the decoder level before being decoded, it is first necessary to understand how video frames are classified. For simple purposes, the written description of this application will classify video frames as one of two types, either key frames or non-key frames. Key frames are also known in the art as intra-frames or i-frames and are self contained video frames containing all information necessary to fully render a single frame of video without referencing any previous or subsequent frames. Non-key frames, also known as predictive frames (p-frames) or bi-directional frames (b-frames), on the other hand, are not self-contained and include data that may reference one or more previous or subsequent frames. For example, during a short video segment, one object may gradually move over a sequence of frames while the rest of the background video content maintains the same positioning. Hence, non-key frames subsequent to the last key frame may only contain data necessary to describe the movement in the position of the one moving object without any data on how to fully render the remaining background of the video content. Thus, since video frames may refer to previous and/or subsequent video frames in a sequence, whenever a frame is dropped at the decoder level there may be visual consequences as dropping a frame will cause any frames referring to the dropped frame to render incorrectly as they are missing some part of information necessary to fully render. The visual quality then diminishes rapidly when any frame is dropped and can only be restored when a key-frame is decoded and maintained as long as no subsequent non-key frames are dropped.

The most common prior solution to the resulting diminishment of visual quality when a frame is dropped at the decoder level prior to now was to drop all consecutive frames until the next key frame once any non-key frame was late. Under this approach, display of incoming video frames will stop once any non-key frame is dropped until the arrival of the next key frame. If the video clip contains few key frames, a viewer may get the impression that playback has stopped or hanged.

Accordingly, it would be advantageous to provide for an improved approach to maintaining AV synchronization which allows for adaptive decoding and dropping of video frames so as to substantially maintain AV synchronization while causing as little negative impact to viewer experience as possible by preventing long pauses in video playback that may otherwise be caused by prior approaches to dropping sequences of non-key frames. Such an improved approach may help to improve the capabilities of a system beyond its comfort zone, allowing for optimal playback of video content in circumstances in which it would otherwise be unable to handle the complexity of the video content.

BRIEF SUMMARY

A method, apparatus, and computer program product are therefore provided to improve the video playback experience for a viewer of a video clip whose complexity exceeds the capabilities of the system on which the video clip is played. In particular, a method, apparatus, and computer program product are provided to enable, for example, the adaptive dropping of non-key video frames at the decoder level depending on the timing of the arrival of non-key frames at the decoder and the proximity of the next key frame. In this regard, AV sync may be maintained in most circumstances and the video stream may not give the appearance of hanging to a viewer. Accordingly, viewer experience may be enhanced when viewing a video clip that exceeds a system's playback capabilities.

In one exemplary embodiment, a method is provided, which may comprise maintaining a next key frame timestamp, decoding a plurality of key frames of a video clip, decoding a plurality of non-key frames of a video clip which arrive on time, and dropping one or more non-key frames until the next key frame if a video frame arrives late and the next key frame is within a calculated drop time window. The determination whether the next key frame is within the drop time window is based upon the next key frame timestamp.

In another exemplary embodiment, a computer program product is provided which includes at least one computer-readable storage medium having computer-readable program code portions stored therein. The computer-readable program code portions include first, second, third, and fourth executable portions. The first executable portion is for maintaining a next key frame timestamp. The second executable portion is for decoding a plurality of key frames of a video clip. The third executable portion is for decoding a plurality of non-key frames of a video clip which arrive on time. The fourth executable portion is for dropping one or more non-key frames until the next key frame if a video frame arrives late and the next key frame is within a calculated drop time window. The determination whether the next key frame is within the drop time window is based upon the next key frame timestamp.

In another exemplary embodiment, an apparatus which may include a processor is provided. The processor may be configured to maintain a next key frame timestamp, decode a plurality of key frames of a video clip, decode a plurality of non-key frames of a video clip which arrive on time, and drop one or more non-key frames until the next key frame if a video frame arrives late and the next key frame is within a calculated drop time window. The determination whether the next key frame is within the drop time window is based upon the next key frame timestamp.

In another exemplary embodiment, an apparatus is provided which may include means for maintaining a next key frame timestamp, means for decoding a plurality of key frames of a video clip, means for decoding a plurality of non-key frames of a video clip which arrive on time, and means for dropping one or more non-key frames until the next key frame if a video frame arrives late and the next key frame is within a calculated drop time window. The determination whether the next key frame is within the drop time window is based upon the next key frame timestamp.

Embodiments of the invention may therefore provide a method, apparatus, and computer program product to enhance video playback. As a result, for example, the experience of a viewer viewing a video clip is enhanced even if the video clip is being played on a system whose capabilities are exceeded by the complexity of the video clip.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
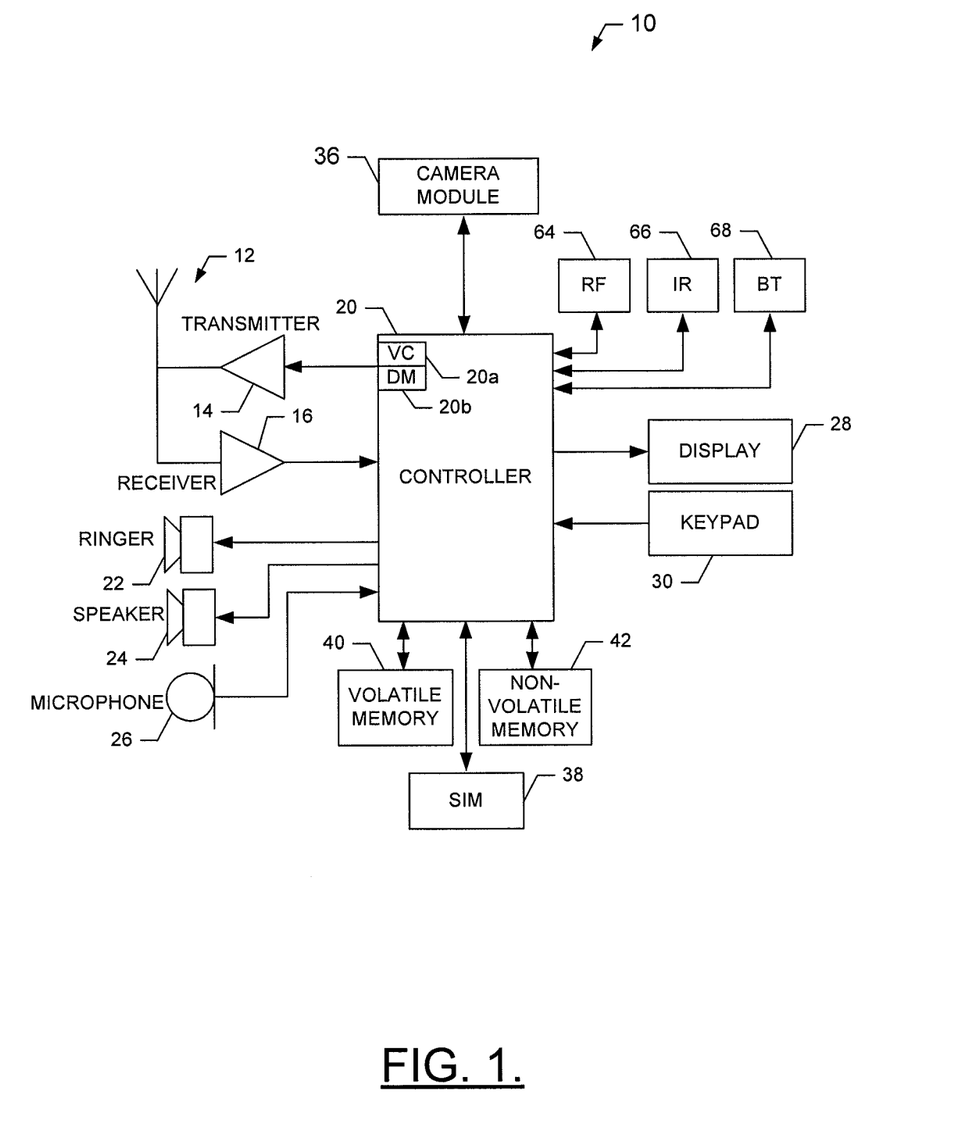
FIG. 1 is a schematic block diagram of a mobile terminal according to an exemplary embodiment of the present invention.

FIG. 1 illustrates a block diagram of a mobile terminal 10 that may benefit from the present invention. It should be understood, however, that the mobile terminal illustrated and hereinafter described is merely illustrative of one type of electronic device that may benefit from the present invention and, therefore, should not be taken to limit the scope of the present invention. While several embodiments of the electronic device are illustrated and will be hereinafter described for purposes of example, other types of electronic devices, such as portable digital assistants (PDAs), pagers, laptop computers, desktop computers, gaming devices, televisions, and other types of electronic systems, may employ the present invention.

As shown, the mobile terminal 10 includes an antenna 12 in communication with a transmitter 14, and a receiver 16. The mobile terminal also includes a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as UMTS network employing WCDMA radio access technology. Some NAMPS, as well as TACS, mobile terminals may also benefit from the teaching of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

In an exemplary embodiment, the mobile terminal 10 includes a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 36, the camera module 36 may include a digital camera capable of forming a digital image file from a captured image or a digital video file from a series of captured images. As such, the camera module 36 includes all hardware, such as a lens or other optical device, and software necessary for creating a digital image or video file from a captured image or series of captured images. Alternatively, the camera module 36 may include only the hardware needed to view an image, while a memory device of the mobile terminal 10 stores instructions for execution by the controller 20 in the form of software necessary to create a digital image or video file from a captured image or images. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode, for example according to a JPEG or MPEG standard format.

Figure 2:
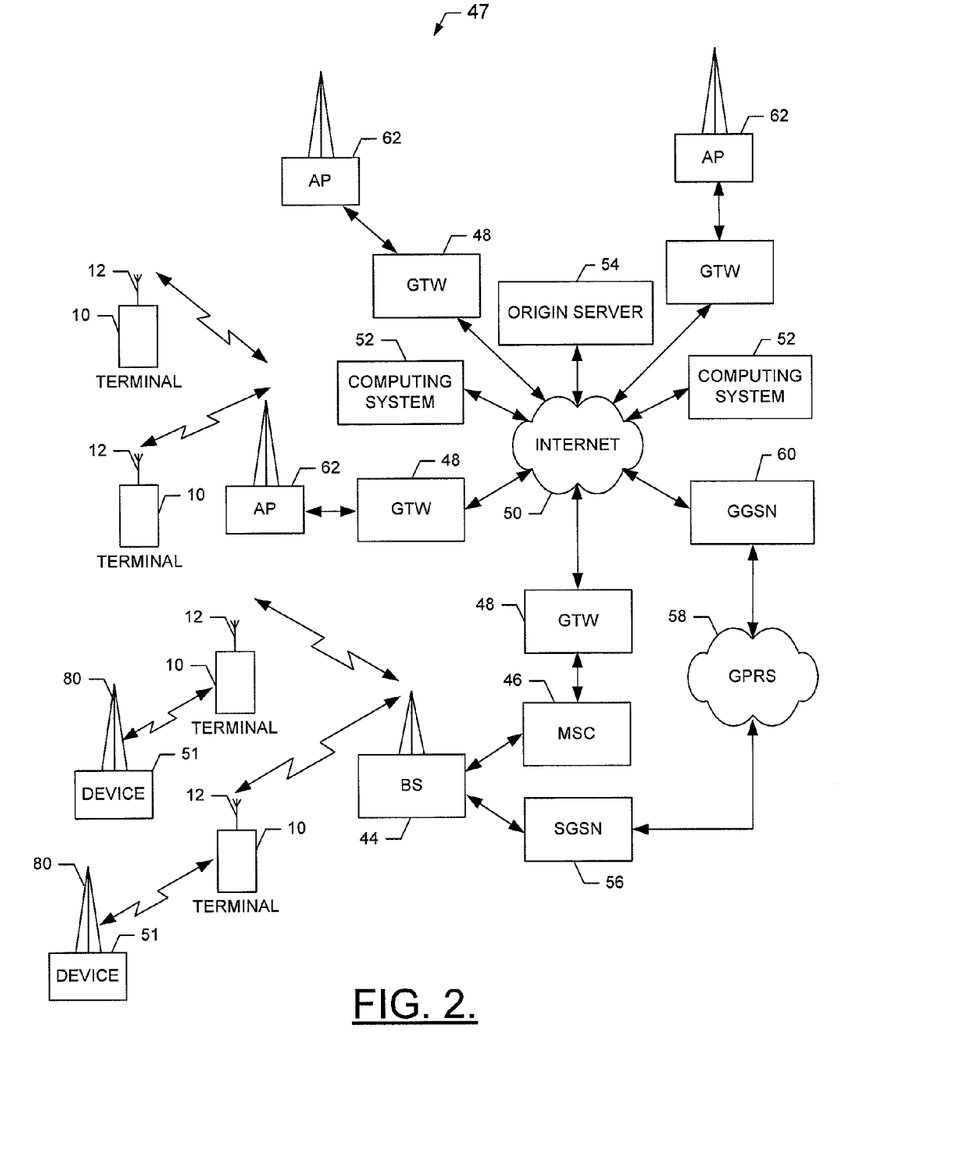
FIG. 2 is a schematic block diagram of a wireless communications system according to an exemplary embodiment of the present invention.

Referring now to FIG. 2, an illustration of one type of system that could support communications to and from an electronic device, such as the mobile terminal of FIG. 1, is provided by way of example, but not of limitation. As shown, one or more mobile terminals 10 may each include an antenna 12 for transmitting signals to and for receiving signals from a base site or base station (BS) 44. The base station 44 may be a part of one or more cellular or mobile networks each of which may comprise elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 may be coupled to a GTW 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

As shown in FIG. 2, the BS 44 may also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown in FIG. 2 and described herein, it should be appreciated that electronic devices, such as the mobile terminal 10, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile terminals (e.g., digital/analog or TDMA/CDMA/analog phones).

As depicted in FIG. 2, the mobile terminal 10 may further be coupled to one or more wireless access points (APs) 62. The APs 62 may comprise access points configured to communicate with the mobile terminal 10 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 and/or origin server 54 across the Internet 50, the mobile terminal 10, computing system 52 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™ and/or UWB techniques. One or more of the computing systems 52 may additionally, or alternatively, include a removable memory capable of storing content, which can thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 10 may be capable of communicating with other devices via short-range communication techniques. For instance, the mobile terminal 10 may be in wireless short-range communication with one or more devices 51 that are equipped with a short-range communication transceiver 80. The electronic devices 51 can comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, wireless accessories, appliances, portable digital assistants (PDAs), pagers, laptop computers, motion sensors, light switches and other types of electronic devices.

Figure 3:
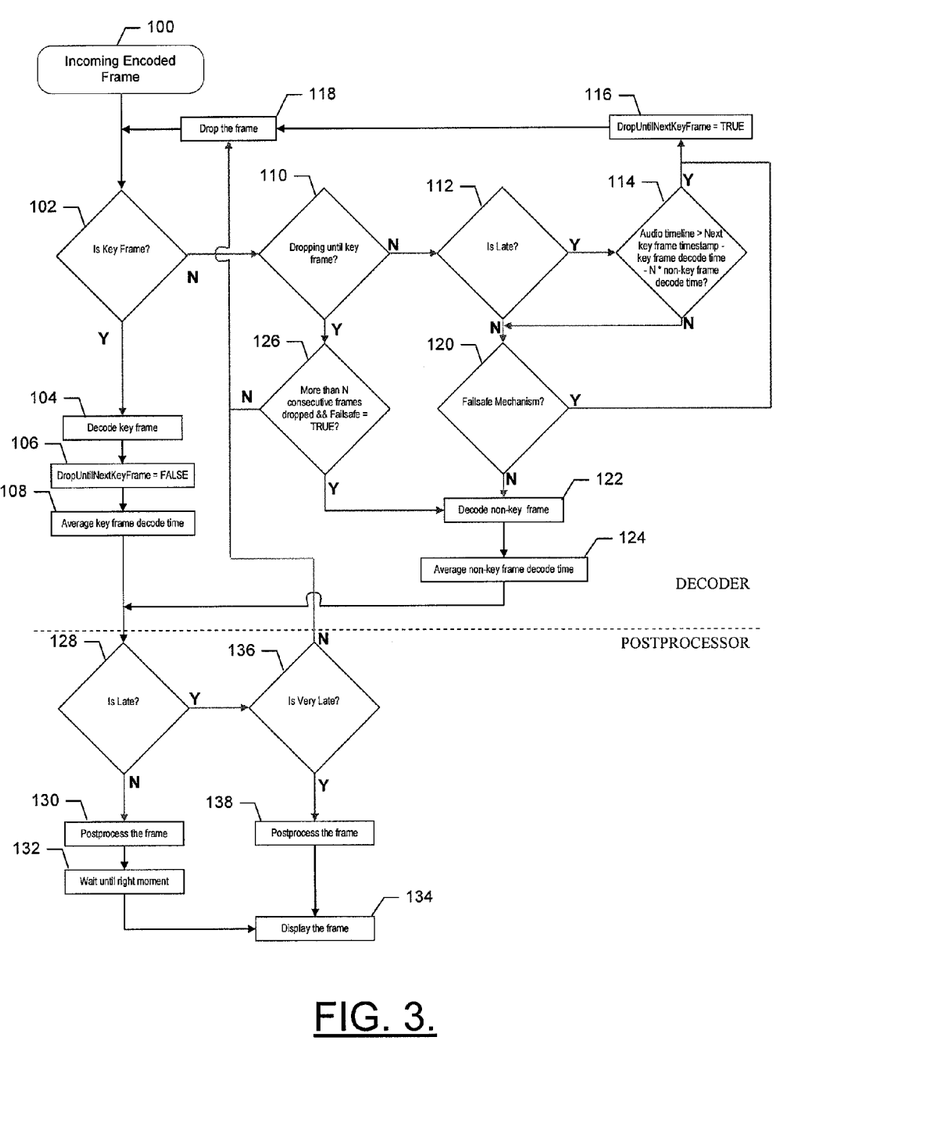
FIG. 3 is a block diagram depicting a flow chart of an adaptive synchronized decoding algorithm according to an exemplary embodiment of the present invention.

FIG. 3 illustrates a block diagram representing a flow chart of an adaptive synchronized decoding algorithm according to an exemplary embodiment of the present invention. It will be understood that each block or step of the flowchart, and combinations of blocks in the flowchart may be implemented by various means, such as hardware, firmware, and/or software including one or more computer program instructions. For example, one or more of the procedures described above may be embodied by computer program instructions. In this regard, these computer program instructions may be stored by a memory device of one or more electronic devices and executed by at least one processor. As will be appreciated, any such computer program instructions may be loaded onto a computing device or other apparatus (i.e., hardware) to produce a machine, such that the instructions which execute on the computing device or other apparatus implement the method of FIG. 3. These computer program instructions may be stored in a computer-readable memory that may direct a computing device or other apparatus to function in a particular manner, such that the instructions stored in the computer-readable memory produce an article of manufacture including instructions to implement the method of FIG. 3. The computer program instructions may be loaded onto a computing device or other apparatus to cause a series of operational steps to be performed on the computing device or other apparatus to produce a computer-implemented process such that the instructions which execute on the computing device or other apparatus provide steps for implementing the method of FIG. 3.

In an exemplary embodiment, the present invention may comprise instructions that may be executed or otherwise controlled by a processor, for example controller 20, of a device, for example mobile terminal 10. For example, a user may view a video clip on display 28 of mobile terminal 10. In an exemplary embodiment, the video clip may reside in memory 42 of mobile terminal 10 and may have previously been downloaded from a remote network device such as the video source 150 of FIG. 4, which may be embodied as the origin server 54. In another exemplary embodiment, the video clip may have been captured by camera module 36 of mobile terminal 10. In yet another exemplary embodiment, the video clip may be stored in memory of one or more of the devices of the system of FIG. 2 and sent, in whole or in part, to mobile terminal 10. The device may adaptively determine when to omit frames, herein referred to as "drop" or "dropping" and/or when to decode frames for AV sync should the complexity of the video clip exceed the capabilities of the controller 20 to decode and playback the video clip. As noted above, the term "AV sync" is used herein interchangeably with the terms "AV synchronization," "audio/video synchronization," and "pacing" and refers to the relative timing of the separate audio and video portions of a video clip wherein ideally the timing of the playback of the audio and video portions will be in synchronization with each other. It will be appreciated that when the complexity of a video clip exceeding the capabilities of a system's hardware, software, or some combination thereof is discussed herein, the term "exceeding the capabilities" does not necessarily mean exceeding the overall capabilities of the system, but merely exceeding the capabilities of the system which may be expended on decoding the video clip.

Figure 4:
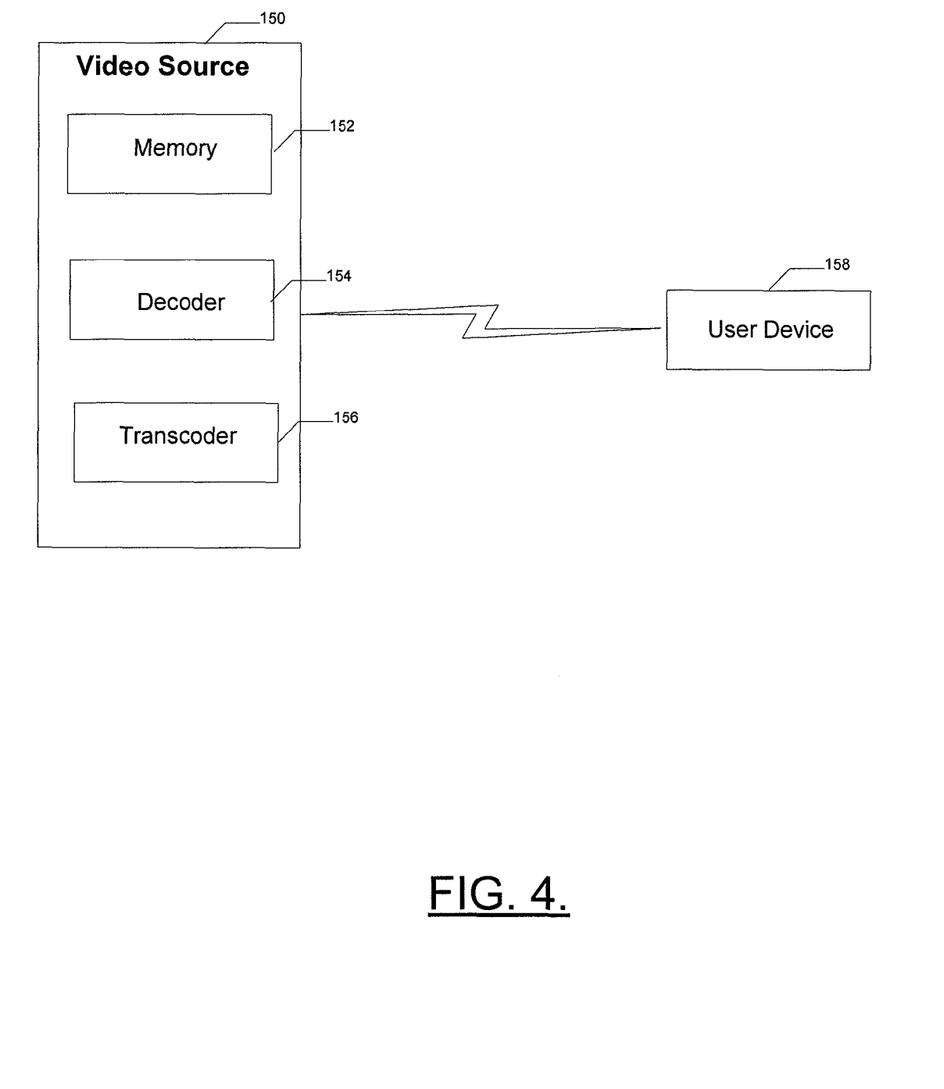
FIG. 4 is a block diagram illustrating a system for decoding and transcoding video clips on a server and streaming the transcoded clips to a remote device according to an exemplary embodiment of the present invention.

The device which comprises the processor for executing instructions which comprise an embodiment of the present invention may be a network device, such as, for example the origin server 54 or a computing system 52 of the system of FIG. 2. The origin server 54 or computing system 52 may serve as a video source 150 as depicted in FIG. 4. Referring now to FIG. 4, in an exemplary embodiment, the video source 150 may have access to a plurality of video clips, which may be stored in memory 152 and its processor(s) may be configured to decode a video clip using a decoder 154, transcode the video clip to a format supported by a remote client device using the transcoder 156, and stream the video clip on demand in real-time over a network link to remote client devices, such as the user device 158, which may be a mobile terminal 10. Even if the decoding and transcoding of a single video clip would not exceed the system resources of the video source 150, decoding, transcoding, and streaming multiple video clips simultaneously may constrain and/or exceed system resources. In accordance with this exemplary embodiment, a device such as a processor of the video source 150 may adaptively drop one or more frames of one or more video clips being decoded and transcoded by the device so as to avoid the loss of AV sync across one or more of the video clips being streamed by the device due to constrained system resources.

In one exemplary embodiment of the adaptive synchronized decoding algorithm of the present invention, several Boolean variables, statistics, and timestamps may be determined and maintained by the decoder to allow for decoder level determinative steps to be executed as described below. For example, the decoder may determine and maintain the current time of the playback of the video. The current time represents the current position of the audio playback and may be informative since embodiments of this invention contemplate that blitting of video frames is driven by audio playback and audio frames are never dropped. The current time may be stored in memory of the device on which embodiments of the invention are implemented, such as, for example, volatile memory 40 of a mobile terminal 10. As described below in conjunction with FIG. 3, the timestamp of any video frame may be compared to the current audio playback position timestamp as represented by the current time to determine whether or not the video frame is late for purposes of determining whether to drop or decode the video frame according to embodiments of the invention.

The decoder may also determine and maintain the time stamp of the next key frame. This time stamp may be stored in memory of the device on which embodiments of the invention are implemented, such as, for example volatile memory 40 of mobile terminal 10. The time stamp of the next key frame indicates when in the playback timeline the next key frame is to be displayed and may be obtained from one or more of several sources. For example, a device which decodes video and drops and/or decodes frames based upon an adaptive synchronized decoding algorithm may contain a plurality of input buffers, which buffer video frames in advance prior to decoding. In this example, if one of the input buffers contains a key frame then the device may extract the time stamp of the key frame, thereby defining the time stamp of the next key frame. As another example, a video clip may have key frames interspersed within the video clip at a known rate, such as one key frame for every 30 frames. In this example, the device may determine the timestamp of the next key frame relative to the previous key frame. In another example, the position of the key frames may be identified to the device prior to decoding. In this regard, a file format parser may have read the video file and identified the position(s) of the key frames prior to decoding by the device. Alternatively, the video file may be associated with an index table which describes the frame sequence of the video clip and identifies the key frames. It should be understood that timestamp may comprise one or more method to signify a time, such as an absolute time reference, an offset time reference, and/or the like.

A device according to embodiments of the invention may separately maintain statistics relating to the time required to decode a single key frame and a single non-key frame. These statistics may be stored in memory of the device, such as, for example, volatile memory 40 of mobile terminal 10. In one embodiment, provided for purposes of example, the statistics may describe the average time required to decode a key frame and the average time required to decode a non-key frame and may be dynamically recalculated by the device each time a frame is decoded. A processor of the device, such as the controller 20 of mobile terminal 10, may determine the average decoding time, such as by executing software providing for this determination. Although the average decode times may be dynamically calculated and maintained so as to estimate the time required to decode an incoming frame, embodiments of the invention are not so limited and need not maintain average decode time statistics. Instead, in alternative embodiments, the device may determine and maintain the time taken to decode each of the last key frame and the last non-key frame. Alternatively, the device may determine a fixed estimate for the time required to decode a key frame and a non-key frame based on, for example, the complexity of the video and taking into account factors such as its resolution. In alternative embodiments, the device may maintain the median decoding time in lieu of average decoding time. All of these approaches and other similar approaches for determining the time required to decode a single key frame and a single non-key frame are contemplated by embodiments of the invention and may be used interchangeably, such as depending on which approach is more efficient. As such, although the time required to decode a single key frame and a single non-key frame will be discussed in terms of average decoding times hereinafter for purposes of example, embodiments of the current invention are not so limited.

The device may also maintain a Boolean logic variable indicating whether all non-key frames are to be dropped consecutively until the next key frame arrives. Initially, this variable may be set to FALSE and upon the arrival and decoding of each key frame may be reset to FALSE. However, the variable may be set to true in certain circumstances that will be discussed below. The value of the variable may be maintained in memory of the device, such as volatile memory 40 of a mobile terminal 10.

Additionally, the device may maintain a variable indicating a number of consecutive frames that have been dropped. The initial value of this variable may be 0 and may be reset thereto each time a frame is decoded. When a frame is dropped, the value may be incremented. The current value of this variable may be maintained in memory of the device, such as volatile memory 40 of a mobile terminal 10. The device may also maintain a variable indicating a maximum number of consecutive frames which may be dropped. The value of this variable may be determined empirically so that a video frame is blitted at least periodically to force the video display to be updated periodically so that a user does not think that video playback has stalled. For example, if the frame rate of a video clip is 30 frames per second (fps), decoding one frame for every 30 frames will guarantee that a frame is blitted once per second. As such, the device may set the maximum number of consecutive frames which may be dropped to 29. The value of this variable may be maintained in memory of the device, such as volatile memory 40 of a mobile terminal 10.

The basic logic behind adaptive synchronized decoding is to attempt to decode all frames consecutively. However, when frames arrive late due to the complexity of the video clip exceeding system resources, adaptive synchronized decoding logic allows for the selective dropping of non-key frames. As may be seen in FIG. 3, operations 100-126 may be performed at the decoder level, such as by the decoder, which may be implemented in hardware, software, or some combination thereof and may be controlled by or otherwise embodied by a processor, such as the controller 20 of a mobile device 10. Operations 128-138 may be performed at the postprocessor level, such as by the postprocessor, which may be implemented in hardware, software, or some combination thereof and may be controlled by or otherwise embodied by a processor, such as the controller 20 of a mobile terminal 10.

Initially, at operation 100, an incoming encoded frame may arrive at the decoder. The decoder may determine whether the incoming frame is a key frame at operation 102. If the frame is a key frame, the decoder may decode the key frame at operation 104. Next, at operation 106, the decoder may reset the value of the Boolean variable indicating whether all frames until the next key frame should be dropped to false. The decoder may then update the variable indicating the time, such as the average time, required to decode a key frame at operation 108.

If, on the other hand, the decoder determines, at operation 102 that the incoming encoded frame is not a key frame, the decoder may determine the value of the Boolean variable indicating whether all frames until the next key frame should be dropped at operation 110. If the value of the Boolean variable is TRUE, indicting that all frames until the next key frame should be dropped, the decoder may compare the value of the variable maintaining the number of consecutive frames which have been previously dropped to the maximum number of consecutive frames which may be dropped, at operation 126. If at operation 126 the values are equal, then the decoder may decode the non-key frame at operation 122. By decoding the non-key frame, the decoder may insure that at least one frame of video is blitted frequently enough to maintain the appearance of ongoing video playback for the user. The decoder may also reset the value of the variable indicating the number of consecutive frames which have been dropped to zero. Subsequently, the decoder may update the average time taken to decode a non-key frame at operation 124. If the determination at operation 126 is that the number of consecutive frames dropped has not reached the maximum allowable number of consecutive dropped frames, the decoder may drop the non-key frame at operation 118.

If at operation 110 the decoder determines that the value of the Boolean variable indicating whether all frames until the next key frame should be dropped is FALSE, then the decoder may determine whether the video frame is late in arriving to the decoder, as shown at operation 112. In an exemplary embodiment, the decoder may make this determination, for example, by comparing the timestamp of the incoming video frame to the current audio playback position. If the timestamp of the incoming video frame is later than the current audio playback position then the incoming video frame may be considered late. If the decoder determines at operation 112 that the incoming encoded frame is not late, then the decoder may decode the non-key frame at operation 122 and the decoder may update the average time to decode a non-key frame at operation 124. If, however, the incoming encoded frame is late in arriving to the decoder, then the decoder may proceed to determine at operation 114 whether the next key frame is within a drop time window. If the next key frame timestamp is within the drop time window, then the decoder may set the Boolean value of the variable indicating whether all frames until the next key frame are to be dropped to TRUE at operation 116 and may proceed to drop the frame at operation 118.

The drop time window (DTW) may be calculated based on the average time required to decode a single key frame (KF_Dec_Time) and the product of the average time required to decode a single non-key frame (NKF_Dec_Time) multiplied by an integer value equivalent to one fewer than the number of output buffers (Num_Output_Buffers) of the device on which embodiments of the invention are implemented. An equation for calculating the drop time window may be represented as follows:

$$DTW=KF\_Dec\_Time+NKF\_Dec\_Time*(Num\_Output\_Buffers-1)$$

Hence, the drop time window value represents the amount of time required to decode the next key frame and enough non-key frames consecutively subsequent to the key frame to fill all of the output buffers of the device. In this regard, if a non-key frame is late in arriving to the decoder and the next key frame will arrive within this drop time window then the decoder may drop all frames until the next key frame so that when it is time to blit the next key frame, that key frame and enough subsequent non-key frames to fill the output buffers will have been decoded so that audio and video playback may be re-synced and synchronization may be maintained for at least awhile thereafter.

It is noted that the impact that the number of output buffers may also have an impact on playback. In this regard, since the number of output buffers may be used to calculate a drop time window, more consecutive non-key frames may be dropped in instances in which there are more output buffers up until a maximum consecutive number of non-key frames have been dropped. Thus, if frames begin to arrive late at a decoder having more output buffers, the pause in video playback between when the first frame is dropped and when the next key frame is displayed may be proportionately longer and thus may be more noticeable to a viewer of the video clip.

If, however, the decoder determines at operation 114 that the next key frame timestamp is not within the drop time window, the decoder may determine whether the failsafe mechanism has been triggered, at operation 120. The failsafe mechanism may represent a compromise between: (1) allowing non-key frames to be decoded and blitted slightly out of synchronization if the next key frame is not within the drop time window and (2) allowing the video playback to lag so far behind the audio playback that not only might system resources be wasted by continuing to decode the late frames, which results in progressively deteriorating AV sync, but the system may become unstable as system resources are further constrained. Hence, if video frames are arriving later than a failsafe threshold, the decoder may set Boolean variable indicating whether all non-key frames before the next key frame should be dropped to TRUE at operation 116. The decoder may then drop the frame at operation 118.

The failsafe threshold represents a constant maximum allowable lag time in video playback and may be determined in several ways. In one embodiment, the failsafe threshold may represent the length of decoded video that a system may buffer in advance. Alternatively, for example, the failsafe threshold may be set according to a fixed length of time beyond which video playback will not be allowed to lag the audio playback, such as, for example 3 seconds. The failsafe mechanism further provides a true 'failsafe' in situations in which the timestamp of the next key frame is not available to allow for the dropping of non-key frames when the next key frame is within the drop time window. In this situation, the failsafe mechanism may be used to avoid the video playback falling behind the audio playback by more than the failsafe threshold and synchronization may be regained at the next key frame.

If, on the other hand, the video frame is late but the next key frame is not within the drop time window and the failsafe mechanism has not been triggered the decoder may decode the non-key frame at operation 122 and the decoder may also update the average time required to decode a non-key frame at operation 124. Late non-key frames may then continue to be decoded and AV sync may progressively be lost until either the next key frame is within the drop time window or the failsafe mechanism is triggered. AV sync may then be regained once the next key frame arrives and is decoded.

Any frames that have been decoded may be passed to a postprocessor, which may postprocess and display the frames. For purposes of embodiments of this invention, the operational logic of the postprocessor does not need to be changed, as in one embodiment, all pertinent decisional logic is executed by the decoder. Referring again to FIG. 3, once a frame arrives at the postprocessor, the postprocessor may determine whether the frame is late, at operation 128. If the frame is not late, then the postprocessor postprocesses the frame at operation 130. The postprocessor may then wait until the moment in the playback timeline at which the frame should be displayed and may then display the frame at operation 134. If, on the other hand, the frame is late, the postprocessor may determine at operation 136 whether the frame is very late. The predefined time threshold for what is considered 'very late' may vary depending on the postprocessor implementation, but in an example embodiment could be on the order of anything over 100 milliseconds. If the frame is not very late, then the frame is dropped. If, however, the frame is very late, as determined by whether the frame arrives later than the predefined threshold, then the frame may be postprocessed at operation 138 and subsequently displayed at operation 134. The logic behind this basic postprocessor implementation is that if a frame is only slightly late, the frame should be dropped in an effort to regain AV sync or at least to prevent the playback from falling farther out of sync. However, if the postprocessor keeps receiving frames consistently later than they should arrive, resulting in frames being 'very late,' the postprocessor may cause the frames to be displayed as AV sync has been lost and the best user experience would be for the video playback to continue rather than having all video frames dropped.

In one embodiment of this invention, however, the device may include logic to further allow decisions of whether to drop or decode and display a frame to be made at the decoder level rather than allowing the postprocessor to decide what frames are late and very late so that the postprocessor does not need any modification to support adaptive synchronized decoding. In order to implement this logic, the decoder may adjust the timestamp of late frames which have been or are to be decoded so that they reflect a time that is only slightly greater than the current time as determined by the position of audio playback so that the postprocessor will display the frames instead of dropping them. The additional time constant added to the present time to calculate the new timestamp may be the average postprocessing time, which would reflect how much time is needed to color convert, scale, rotate, etc the decoded frame before displaying the frame. As this value may be much less dynamic than decoding times, it may be considered constant between clips. Thus, while an alternative embodiment would be to dynamically calculate the average postprocessing time as is done for frame decoding time, static values may, instead, be used to avoid making any modifications to the postprocessor logic. For example, in one embodiment a reference table containing an estimate of average postprocessing times dependant on the resolution or other measures of complexity of the video clip may be stored in memory, such as non-volatile memory 42 of a mobile terminal 10, and referenced by the decoder to determine the constant average postprocessing time to add to the current time to obtain the new value for the timestamp for late frames. The values stored in this table may vary depending on the actual software and hardware configuration of a system on which a video clip is being postprocessed.

In one example embodiment, time stamp modification may not be performed on every decoded frame which is late. Instead, it may only be performed on frames which are later than a late frame tolerance value, so that time stamp modification is only applied when frames are progressively late and not just slightly delayed while playback is still synchronized. For example, the late frame tolerance value may be set to 50 milliseconds as postprocessors often have a threshold value of ±20 milliseconds for determining whether a frame is on time. The above values, however, are merely for purposes of example and embodiments of this invention are not limited to the above values with regard to late frame tolerance. In this regard, the postprocessor may still be allowed to drop frames which are only slightly late when playback is still basically synchronized. However, if playback is falling out of synchronization, then the decoder may determine whether to display decoded frames in order to provide a viable experience for a viewer.

Figure 5:
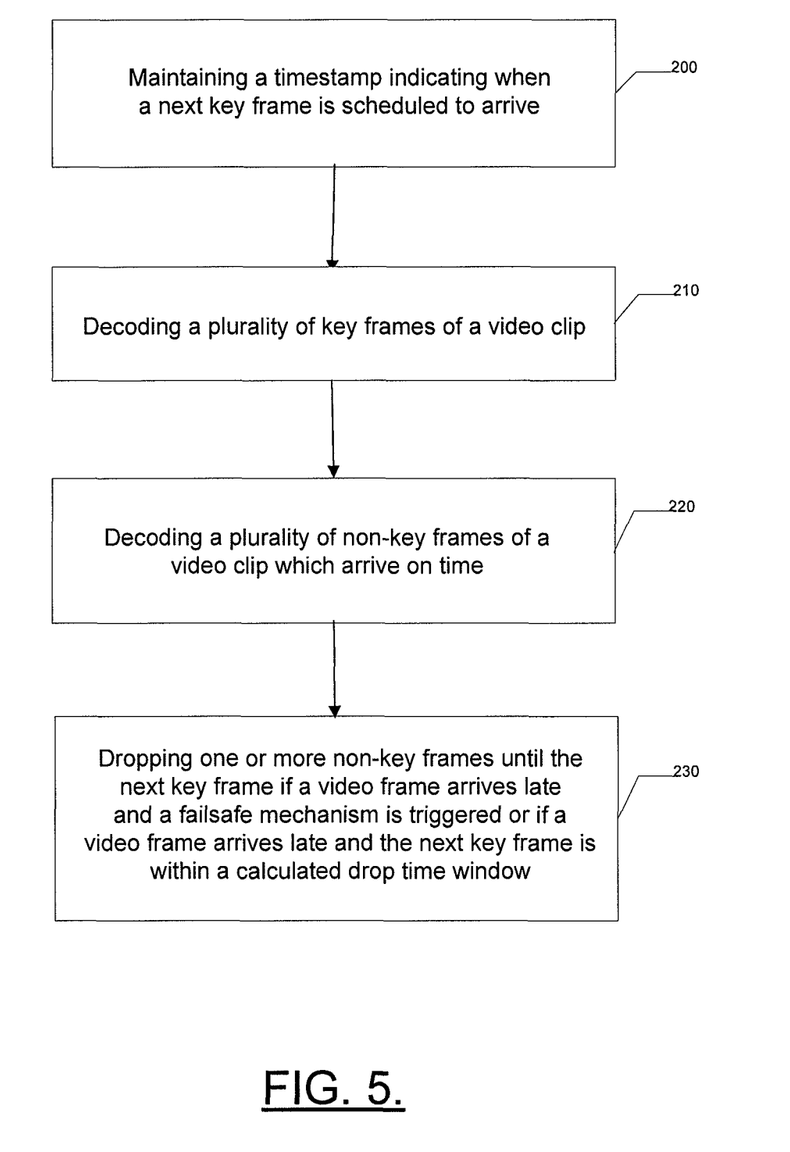
FIG. 5 is a flowchart according to an exemplary method for adaptive synchronized decoding.

FIG. 5 is a flowchart of the operations that may be performed by a method and computer program product according to an exemplary embodiment of the invention. The operations of the flowchart of FIG. 5 represent simplified combinations of steps of the operations shown in FIG. 3 according to an exemplary embodiment of the invention. It will be understood that each block or step of the flowchart, and combinations of blocks in the flowchart may be implemented by various means, such as hardware, firmware, and/or software including one or more computer program instructions. For example, one or more of the procedures described above may be embodied by computer program instructions. In this regard, these computer program instructions may be stored by a memory device of one or more electronic devices and executed by at least one processor. As will be appreciated, any such computer program instructions may be loaded onto a computing device or other apparatus (i.e., hardware) to produce a machine, such that the instructions which execute on the computing device or other apparatus implement the method of FIG. 5. These computer program instructions may be stored in a computer-readable memory that may direct a computing device or other apparatus to function in a particular manner, such that the instructions stored in the computer-readable memory produce an article of manufacture including instructions to implement the method of FIG. 5. The computer program instructions may be loaded onto a computing device or other apparatus to cause a series of operational steps to be performed on the computing device or other apparatus to produce a computer-implemented process such that the instructions which execute on the computing device or other apparatus provide steps for implementing the method of FIG. 4.

In this regard, one embodiment of a method of adaptive synchronized decoding of video clips is illustrated in FIG. 5. The operations of this method may be executed at the decoder level, such as by the decoder, which may be implemented in hardware, software, or some combination thereof and may be controlled by or otherwise embodied by a processor, such as the controller 20 of a mobile device 10. The method may include maintaining a next key frame timestamp in operation 200. As shown at operation 210, a plurality of key frames of a video clip may be decoded. Although in one embodiment, all key frames are decoded, embodiments of the invention are not limited thereby and a key frame may be dropped from time to time. As represented by operation 220, a plurality of non-key frames of a video clip which arrive on time may be decoded. However, one or more non-key frames may be dropped until the next key frame if a video frame arrives late and a failsafe mechanism is triggered or if a video frame arrives late and the next key frame is within a calculated drop time window, as shown in operation 230.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention may include a computer-readable storage medium, such as the non-volatile storage medium, and computer-readable program code portions, such as a series of computer instructions, embodied in the computer-readable storage medium.

As such, then, embodiments of the present invention may enhance AV synchronization and the experience of a viewer of a video clip. In one regard, embodiments of the invention allow for a device, such as a mobile terminal 10, which is decoding a video clip to playback a video clip with a complexity that exceeds the capabilities of the hardware and/or software of the device. Knowledge of when the next key frame will arrive allows for dropping of a consecutive sequence of non-key frames prior to the next key frame when frames are arriving late at the decoder so that the next key frame and a plurality of subsequent frames may be buffered in advance, thereby permitting AV sync to be regained at the next key frame. If key frames are infrequent in the video clip and video playback is falling progressively further behind audio playback, the failsafe mechanism of embodiments of the present invention may help to avoid a situation where the video playback falls farther behind the audio playback than a failsafe threshold by providing for dropping of a plurality of non-key frames prior to the next key frame when synchronization may be regained. Also, embodiments of the invention may facilitate a situation where dropping of a series of non-key frames interferes with viewer experience as little as possible by limiting the number of consecutive frames which may be dropped so that at least one frame is blitted periodically, thereby updating the display to alert a viewer that playback has not stopped. Moreover, embodiments of the invention allow for enhanced playback of video clips which exceed a system's complexity without dropping any audio frames.

Embodiments of the invention may also be embodied in media streaming or realtime transcoding devices. Although these devices generally have hardware and software capabilities which greatly exceed that of the average user device on which video clips are viewed such as a mobile terminal 10, video clips may still be created which exceed the hardware and/or software capabilities of such a device. Also, the devices generally simultaneously decode and transcode a plurality of video clips on demand for streaming to a plurality of remote users. As such, the system resources may become constrained and embodiments of the invention may serve to allow synchronization to be better maintained across the plurality of video clips so that more video clips may be decoded while preserving AV sync.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving a video frame at a decoder and determining that the received video frame is a key video frame;
   maintaining a next key frame timestamp;
   receiving a further video frame at the decoder and determining that the received further video frame is a non-key video frame;
   determining at the decoder that the non-key video frame is late in arriving at the decoder by comparing the time stamp of the non-key video frame to a current audio playback position time stamp, wherein the current audio playback position time stamp represents the current position of the audio playback; and
   determining at the decoder that further non-key video frames received until the next key video frame are dropped depending on whether the non-key video frames arrive late at the decoder and whether the next key frame timestamp is within a calculated drop time window, wherein the drop time window is calculated to represent the amount of time required to decode the next key video frame and to decode a quantity of non-key video frames consecutively subsequent to the received key video frame sufficient to fill an output buffer.

2. A method according to claim 1 further comprising maintaining a count of the number of consecutive non-key video frames which have been dropped and decoding the non-key video frame depending on whether more than a predetermined maximum number of consecutive non-key video frames have been dropped.

3. A method according to claim 2 wherein the predetermined maximum number of consecutive non-key video frames which may be dropped is determined so that that non-key video frames will be decoded with a frequency sufficient to alert a viewer of a video clip that playback has not ceased.

4. A method according to claim 1 further comprising determining if the non-key video frame arriving at the decoder is later than a predefined threshold and if so modifying a timestamp on the non-key video frame to reflect a time that is greater than the current position of the audio playback so that the non-key video frame will be postprocessed by a postprocessor after the non-key video frame has been decoded by the decoder.

5. A method according to claim 4 wherein the predefined threshold is 100 milliseconds.

6. A method according to claim 1 wherein the timestamp of the next key video frame is maintained by extracting a timestamp of the next key video frame from one or more of a buffered key video frame, a known constant rate at which key video frames are interspersed within a video clip, a file format parser which has read a file describing the video clip and identified the key video frames, or from an index table associated with the video clip.

7. A method according to claim 1 further comprising:
   dropping one or more non-key video frames until the next key video frame if a non-key video frame arrives late and a failsafe mechanism is triggered, wherein the failsafe mechanism is triggered if the non-key video frame is delayed by a length of time greater than the drop time window, wherein the failsafe mechanism comprises a further predefined threshold representing a constant maximum allowable lag time in video playback; and
   maintaining a count of the number of consecutive non-key video frames which have been dropped and if more than a predetermined maximum number of consecutive non-key video frames have been dropped, decoding the non-key video frame.

8. A non-transitory computer-readable storage medium having computer-readable program code portions stored therein, the computer-readable program code portions comprising program code portions, which when executed by a processor, are configured to cause an apparatus to at least:
   receive a video frame at a decoder and determine that the received video frame is a key video frame;
   maintain a next key frame timestamp;
   receive a further video frame at the decoder and determine that the received further video frame is a non-key video frame;
   determine at the decoder that the non-key video frame is late in arriving at the decoder by comparing the time stamp of the non-key video frame to a current audio playback position time stamp, wherein the current audio playback position time stamp represents the current position of the audio playback; and
   determine at the decoder that further non-key video frames received until the next key video frame are dropped depending on whether the non-key video frames arrive late at the decoder and whether the next key frame timestamp is within a calculated drop time window, wherein the drop time window is calculated to represent the amount of time required to decode the next key video frame and to decode a quantity of non-key video frames consecutively subsequent to the received key video frame sufficient to fill an output buffer.

9. A computer program product according to claim 8, further comprising program code portions, which when executed by the processor, are configured to further cause the apparatus to maintain a count of the number of consecutive non-key frames which have been dropped and decode the non-key video frame depending on whether more than a predetermined maximum number of consecutive non-key video frames have been dropped.

10. A computer program product according to claim 9 wherein the predetermined maximum number of consecutive non-key video frames which may be dropped is determined so that non-key video frames will be decoded with a frequency sufficient to alert a viewer of a video clip that playback has not ceased.

11. A computer program product according to claim 8, further comprising program code portions, which when executed by the processor, are configured to further cause the apparatus to determine if the non-key video frame arriving at the decoder is later than a predefined threshold and if so modifying a timestamp on the non-key video frame to reflect a time that is greater than the current position of the audio playback so that the non-key video frame will be postprocessed by a postprocessor after the non-key video frame has been decoded by the decoder.

12. A computer program product according to claim 11, wherein the predefined threshold is 100 milliseconds.

13. A computer program product according to claim 8, further comprising program code portions, which when executed by the processor, are configured to further cause the apparatus to maintain the timestamp of the next key video frame by extracting a timestamp of the next key video frame from one or more of a buffered key frames, a known constant rate at which key video frames are interspersed within a video clip, a file format parser which has read a file describing the video clip file and identified the key video frames, or from an index table associated with the video clip.

14. A computer program product according to claim 8, further comprising program code portions, which when executed by the processor, are configured to further cause the apparatus to:
   drop one or more non-key video frames until the next key video frame if a non-key video frame arrives late and a failsafe mechanism is triggered, wherein the failsafe mechanism is triggered if the non-key video frame is delayed by a length of time greater than the drop time window, wherein the failsafe mechanism comprises a further predefined threshold representing a constant maximum allowable lag time in video playback; and
   maintain a count of the number of consecutive non-key video frames which have been dropped and if more than a predetermined maximum number of consecutive non-key video frames have been dropped, decoding the non-key video frame.

15. An apparatus comprising at least one processor and at least one memory storing computer program code, wherein the at least one memory and stored computer program code are configured, with the at least one processor, to cause the apparatus to at least:
   receive a video frame at a decoder and determine that the received video frame is a key video frame;
   maintain a timestamp of the next key frame;
   receive a further video frame at the decoder and determine that the received further video frame is a non-key video frame;
   determine at the decoder that the non-key video frame is late in arriving at the decoder by comparing the time stamp of the non-key video frame to a current audio playback position time stamp, wherein the current audio playback position time stamp represents the current position of the audio playback; and
   determine at the decoder that further non-key video frames received until the next key video frame are dropped depending on whether the non-key video frames arrive late at the decoder and whether the next key frame timestamp is within a calculated drop time window, wherein the drop time window is calculated to represent the amount of time required to decode the next key video frame and to decode a quantity of non-key video frames consecutively subsequent to the received key video frame sufficient to fill an output buffer.

16. An apparatus according to claim 15 wherein the at least one memory and stored computer program code are configured to, with the at least one processor, further cause the apparatus to maintain a count of the number of consecutive non-key video frames which have been dropped and decode the non-key video frame depending on whether more than a predetermined maximum number of consecutive non-key video frames have been dropped.

17. An apparatus according to claim 16 wherein the predetermined maximum number of consecutive non-key video frames which may be dropped is determined so that non-key video frames will be decoded with a frequency sufficient to alert a viewer of a video clip that playback has not ceased.

18. An apparatus according to claim 15, wherein the at least one memory and stored computer program code are configured to, with the at least one processor, further cause the apparatus to determine if a non-key video frame arriving at the decoder is later than a predefined threshold and if so to modify a timestamp on the non-key video frame so that the non-key video frame will be postprocessed by a postprocessor after the non-key video frame has been decoded by the decoder.

19. An apparatus according to claim 18, wherein the predefined threshold is 100 milliseconds.

20. An apparatus according to claim 15, wherein the at least one memory and stored computer program code are configured to, with the at least one processor, further cause the apparatus to maintain the timestamp of the next key video frame by extracting a timestamp of the next key video frame from one or more of a buffered key video frame, a known constant rate at which key video frames are interspersed within a video clip, a file format parser which has read a file describing the video clip and identified the key video frames, or from an index table associated with the video clip.

21. An apparatus according to claim 15, wherein the at least one memory and stored computer program code are configured to, with the at least one processor, further cause the apparatus to:
   drop one or more non-key video frames until the next key video frame if a non-key video frame arrives late and a failsafe mechanism is triggered, wherein the failsafe mechanism is triggered if the non-key video frame is delayed by a length of time greater than the drop time window, wherein the failsafe mechanism comprises a further predefined threshold representing a constant maximum allowable lag time in video playback; and
   maintain a count of the number of consecutive non-key video frames which have been dropped and if more than a predetermined maximum number of consecutive non-key video frames have been dropped to decode the non-key video frame.

22. An apparatus according to claim 15, wherein the apparatus comprises or is embodied on a mobile phone, the mobile phone comprising a user interface; wherein the user interface is configured to:
   facilitate user control of at least some functions of the mobile phone through use of a display.

* * * * *